(12) United States Patent
Sun

(10) Patent No.: US 12,157,127 B2
(45) Date of Patent: Dec. 3, 2024

(54) ENERGY-SAVING DOUBLE-BEARING VERTICAL GRINDING MILL FOR DRY GRINDING AND SHAPING

(71) Applicant: Xiamen ISO Standard Sand Co., Ltd., Fujian (CN)

(72) Inventor: Zhisheng Sun, Beijing (CN)

(73) Assignee: xiamen ISO Standard Sand Co., Ltd.

( * ) Notice: Subject to any disclaimer, the term of this patent is extended or adjusted under 35 U.S.C. 154(b) by 505 days.

(21) Appl. No.: 17/433,989

(22) PCT Filed: May 24, 2021

(86) PCT No.: PCT/CN2021/095462
§ 371 (c)(1),
(2) Date: Aug. 25, 2021

(87) PCT Pub. No.: WO2022/198779
PCT Pub. Date: Sep. 29, 2022

(65) Prior Publication Data
US 2023/0356233 A1 Nov. 9, 2023

(30) Foreign Application Priority Data
Mar. 22, 2021 (CN) .......................... 202110302477.5

(51) Int. Cl.
*B02C 17/16* (2006.01)
*B02C 17/10* (2006.01)
(Continued)

(52) U.S. Cl.
CPC .............. *B02C 17/16* (2013.01); *B02C 17/10* (2013.01); *B02C 17/183* (2013.01); *B02C 17/22* (2013.01); *B02C 17/24* (2013.01)

(58) Field of Classification Search
CPC ....... B02C 17/16; B02C 17/10; B02C 17/183; B02C 17/22; B02C 17/24; B02C 17/184;
(Continued)

(56) References Cited

U.S. PATENT DOCUMENTS

| 4,754,934 A * | 7/1988 | Ikebuchi | ................. B02C 17/16 241/171 |
| 2010/0102151 A1* | 4/2010 | Gerl | ...................... B02C 17/188 241/47 |
| 2023/0234069 A1* | 7/2023 | Imhof | .................... B02C 23/36 241/46.11 |

FOREIGN PATENT DOCUMENTS

| CN | 201768522 U * | 3/2011 | ........... B02C 17/163 |
| CN | 107442218 A * | 12/2017 | ........... B02C 17/163 |
(Continued)

OTHER PUBLICATIONS

English translate (CN201768522U), retrieved date Nov. 30, 2023.*
(Continued)

*Primary Examiner* — Mohammed S. Alawadi
(74) *Attorney, Agent, or Firm* — Jose Cherson Weissbrot

(57) ABSTRACT

An energy-saving double-bearing vertical grinding mill for dry grinding and shaping, comprising a shell, a permanent magnet variable frequency motor arranged above the shell, a rotating shaft connected with the output end of the permanent magnet variable frequency motor, and a double-spiral rotor arranged on the rotating shaft, wherein a grinding chamber is formed in the shell, wherein an upper bearing and a lower bearing are respectively arranged at top and bottom of the grinding chamber, wherein the upper bearing and the lower bearing are both sleeved on the rotating shaft and are respectively located at upper end and lower end of the rotating shaft, wherein the upper bearing and the lower
(Continued)

bearing are both rotatably connected with the rotating shaft, wherein the grinding chamber is filled with a grinding medium.

9 Claims, 10 Drawing Sheets

(51) Int. Cl.
*B02C 17/18* (2006.01)
*B02C 17/22* (2006.01)
*B02C 17/24* (2006.01)

(58) Field of Classification Search
CPC ..... B02C 17/1875; B02C 17/18; B02C 23/18; B02C 25/00
See application file for complete search history.

(56) References Cited

FOREIGN PATENT DOCUMENTS

| CN | 105833944 B | * | 1/2019 | ............. B02C 13/14 |
| CN | 208928298 U | * | 6/2019 | ........... B02C 17/163 |

OTHER PUBLICATIONS

English translate (CN107442218A), retrieved date Nov. 30, 2023.*
English translate (CN208928298U), retrieved date Dec. 1, 2023.*
English translate (CN105833944B), retrieved date Dec. 1, 2023.*

* cited by examiner

ENERGY-SAVING DOUBLE-BEARING VERTICAL GRINDING MILL FOR DRY GRINDING AND SHAPING

TECHNICAL FIELD

This invention generally relates to the technical field of vertical grinding mills, and more particularly, to an energy-saving double-bearing vertical grinding mill for dry grinding and shaping.

BACKGROUND

An industrial grinding mill is a type of basic equipment widely used in field such of mining, electric power, steel, cement and ceramics, etc. Such type of equipment is cumbersome, huge and energy-intensive. Industrial tube mills have not been improved substantially since FLSmidth (Denmark) developed a tube mill for cement industry in 1882. The efficiency of conventional industrial tube mills is extraordinarily low. Its energy utilization rate is merely 2-3% because more than 95% of the consumed electric energy is converted into waste heat and noise.

Presently, the conventional equipment for grinding cement and other dry powders, such as a roll squeezer (roll-type vertical mill) combined with a tube mill or a roll-type vertical milling system, has shortcomings including high investment, low operation rate, high operation cost, high power consumption, high noise, heavy metal pollution and poor particle morphology (e.g., degree of sphericity and length-diameter ratio) of ground cement products, which severely affect the operating performance, degree of density and durability of the finished concrete products, resulting in a worldwide technical problem.

Moreover, the conventional grinding mills are mostly used for the wet grinding process, and thus most of them comprise a variable frequency motor, a reducer and a single bearing. This structure has the following shortcomings:

First, the vibration of the rotor is significant, and the manufacturing requirements of the rotor are high. When significant vibration of the rotor occurs, the rotor speed must be lowered, drastically reducing the grinding efficiency;

Second, a special coupling (special couplings with a power higher than 630 Kw can only be manufactured by European companies) is required to match with the variable frequency motor and the reducer. Presently, the special couplings need to be imported in a lot of countries, which further prolongs the manufacturing cycle of the vertical grinding mills by 4-6 months.

Third, the rotor needs to be removed from the equipment during maintenance, which is laborious and difficult.

Therefore, to solve the technical problems in the prior art, the present invention provides an energy-saving double-bearing vertical grinding mill for dry grinding and shaping.

SUMMARY

The purpose of the present invention is to provide an energy-saving double-bearing vertical grinding mill for dry grinding and shaping.

To achieve the above purpose, the present invention adopts the following technical solution: an energy-saving double-bearing vertical grinding mill for dry grinding and shaping comprising a shell arranged vertically, a permanent magnet variable frequency motor arranged above the shell, a rotating shaft connected with the output end of the permanent magnet variable frequency motor and a double-spiral rotor arranged on the rotating shaft, wherein a grinding chamber is formed in the shell, wherein an upper bearing and a lower bearing are respectively arranged at the top and the bottom of the grinding chamber, wherein the upper bearing and the lower bearing are both sleeved on the rotating shaft and are respectively located at the upper end and the lower end of the rotating shaft, wherein the upper bearing and the lower bearing are both rotatably connected with the rotating shaft, wherein a grinding medium is filled in the grinding chamber, and the upper end/upper end surface of the side wall of the shell is provided with a feeding port and a dust collecting port in communication with the interior of the grinding chamber, and wherein at least two discharging ports in communication with the interior of the grinding chamber are arranged on the lower end/the lower end surface of the side wall of the shell, and the lower end surface of the shell is arranged in an air blowing port in communication with the interior of the grinding chamber.

In another embodiment of the present invention, the side wall of the shell is provided with at least one opening, and the opening is provided with an access door. Preferably, the opening is provided with two access doors. The two access doors can operate simultaneously to improve the operating efficiency. Especially during maintenance, it is unnecessary to take out the double-spiral rotor.

In another embodiment of the present invention, the inner side wall of the shell and the side wall of the access door are respectively provided with a first lining plate and a second lining plate. The first lining plate and the second lining plate form the grinding chamber.

In another embodiment of the present invention, the first lining plate, the second lining plate and the grinding medium are made of a corundum material.

In another embodiment of the present invention, the upper bearing and the lower bearing are rolling bearings.

In another embodiment of the present invention, the double-spiral rotor comprises spiral plates that spiral downward towards two different directions along the central axis direction of the rotating shaft and a plurality of spiral lining plates arranged on the spiral plates. The spiral lining plate adopts a combined structure and is made of a corundum material.

In another embodiment of the present invention, a discharging grate is arranged at the discharging port, and a plurality of horizontal gaps with equal intervals are arranged on the discharging grate. The size of the horizontal gap ranges from 2-6 mm.

In another embodiment of the present invention, the feeding port is connected with a metering and conveying device, and the discharging port is connected with a discharging control device.

In another embodiment of the present invention, the discharging control device further comprises a spiral gate plate, a pneumatic gate plate, an electric flow valve and a metering device.

In another embodiment of the present invention, the dust collecting port is connected with a dust collector. A plurality of small ventilation openings is formed in the position where the air blowing port and the shell are connected, and the air blowing port is connected with an air blowing device.

In another embodiment of the present invention, the plurality of ventilation openings is arranged at equal intervals in a ring shape or a circular shape. When the permanent magnet variable frequency motor is arranged above the shell, the plurality of ventilation openings is arranged in a ring shape or a circular shape, and when the permanent magnet variable frequency motor is arranged below the shell, the plurality of ventilation openings is arranged in a circular shape.

In another embodiment of the present invention, a base is arranged below the shell. The base is configured to be cylindrical. The portion of the base above ground is hollow, and the side surface of the base is provided with an access port. When the permanent magnet variable frequency motor is arranged below the shell, the permanent magnet variable frequency motor is fixed on the base.

Compared with the prior art, the present invention has the following advantages:

Through respectively arranging the upper bearing and the lower bearing on the upper end and the lower end of the rotating shaft, the vibration and of the double-spiral rotor is reduced and the manufacturing requirement is lowered. The rotating speed of the double-spiral rotor is increased such that the grinding efficiency is improved. Through adopting the double-bearing structure, the imported special coupling is replaced by a common coupling, so that the manufacturing period of the vertical grinding mill is shortened by 4-6 months. The transmission structure is simple, the transmission efficiency is improved, the noise is reduced, the lubricant consumed by the reducer is reduced, the consumption of cooling water is reduced, the consumption of natural resources is reduced and the establishment of an eco-friendly society is facilitated.

BRIEF DESCRIPTION OF THE DRAWINGS

The drawings described herein are used to facilitate a further understanding of the present invention while forming a part of the present invention. The embodiments of the present invention and the description thereof are used to explain the present invention but not form an improper limitation of the present invention.

FIG. 5 is a conceptual diagram (ventilation openings arranged in a ring shape) illustrating the interior of the vertical grinding mill of the present invention.

MARKING INSTRUCTIONS OF THE FIGURES

Figure 1:
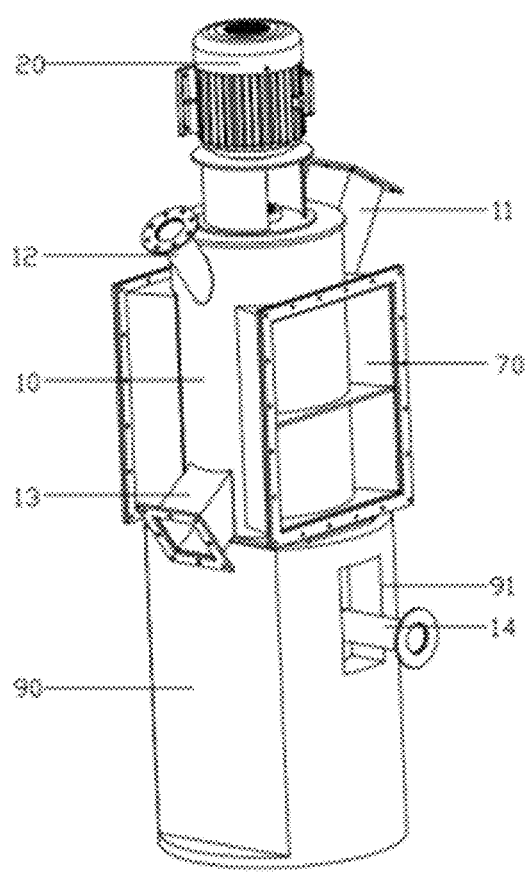
FIG. 1 is a conceptual diagram illustrating an exemplary structure of the vertical grinding mill of the present invention.
Figure 2:
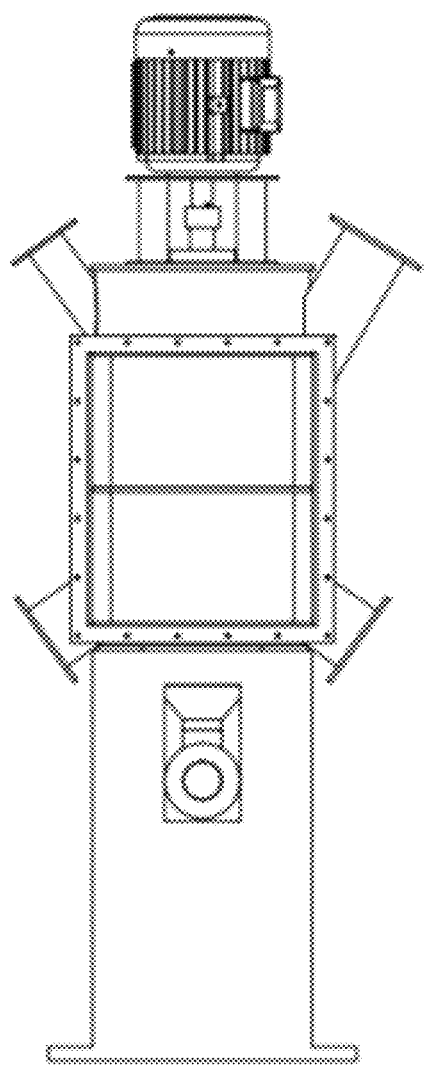
FIG. 2 is a conceptual diagram illustrating a front view of the vertical grinding mill of the present invention.
Figure 3:
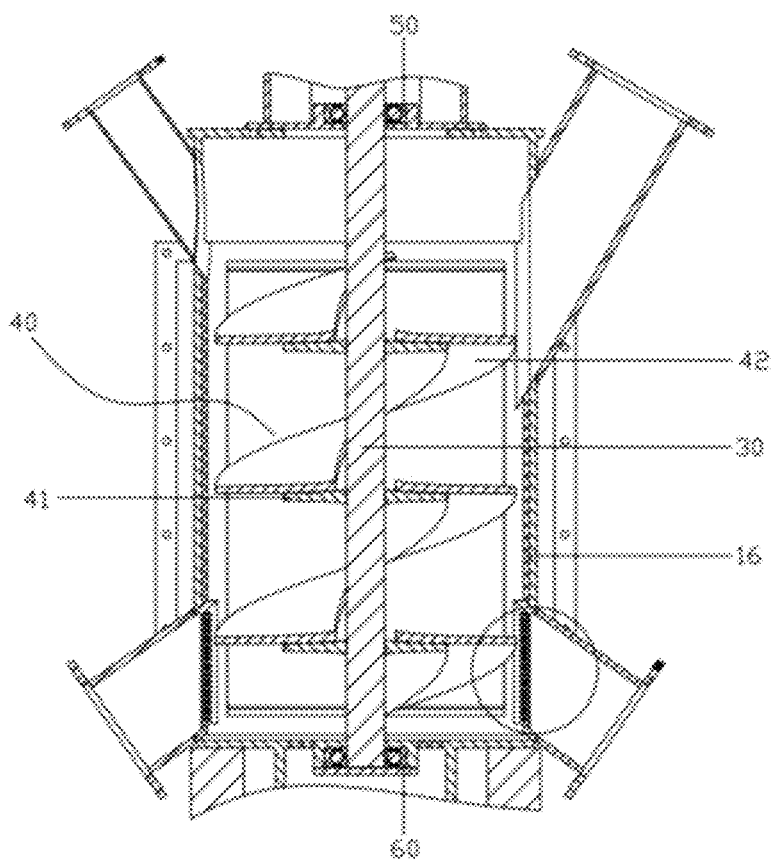
FIG. 3 is a conceptual diagram illustrating a partial sectional view of the vertical grinding mill of the present invention.
Figure 4:
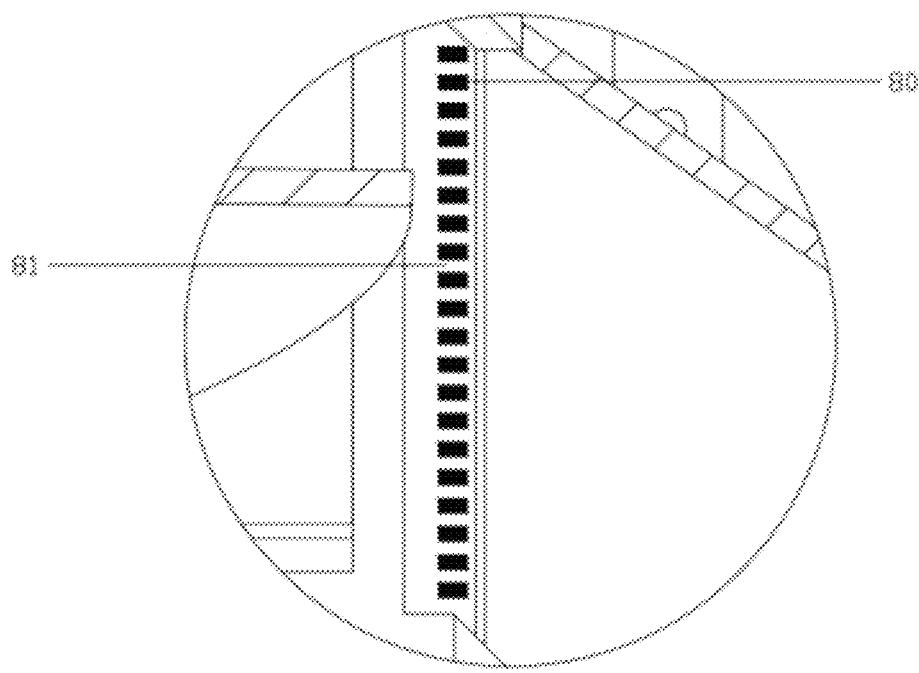
FIG. 4 is a partially enlarged diagram of FIG. 3.
Figure 3:
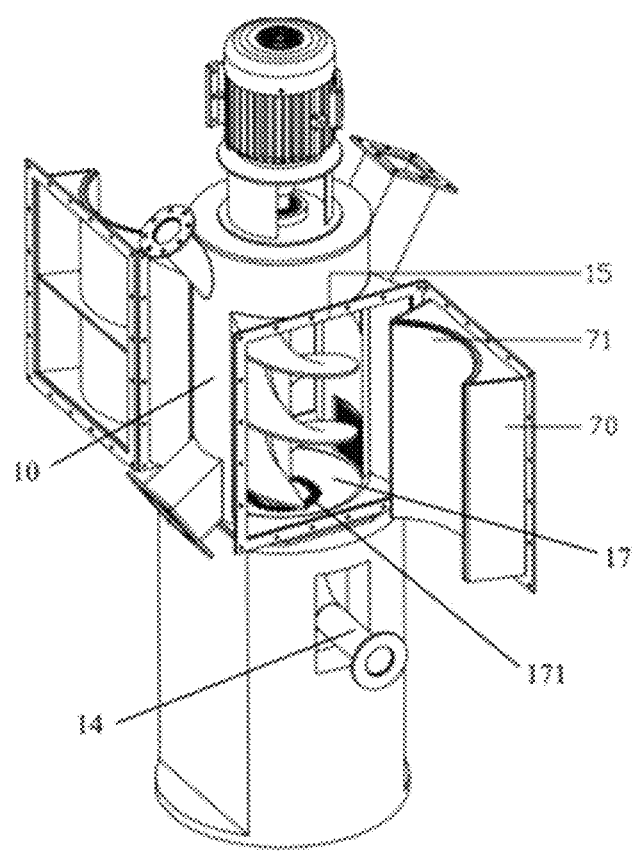
Figure 6:
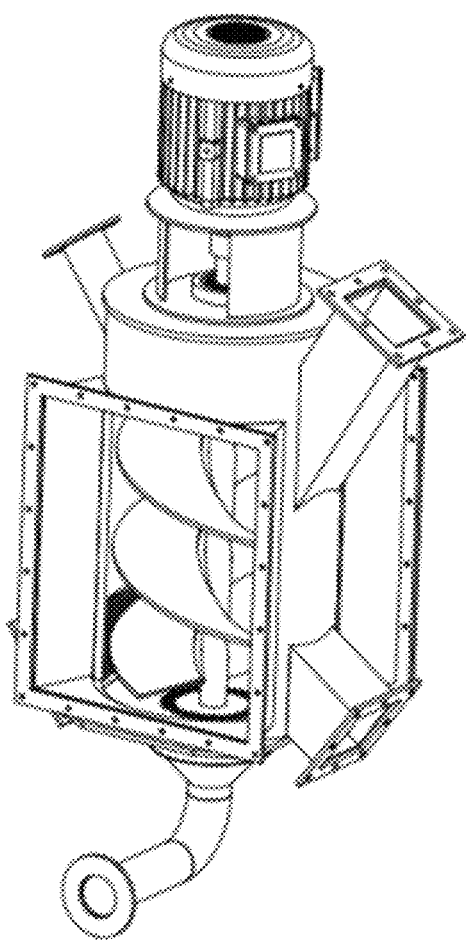
FIG. 6 is a conceptual diagram (ventilation openings arranged in a ring shape) illustrating the installation of the rotating shaft and the double-spiral lining palate of the present invention.
Figure 7:
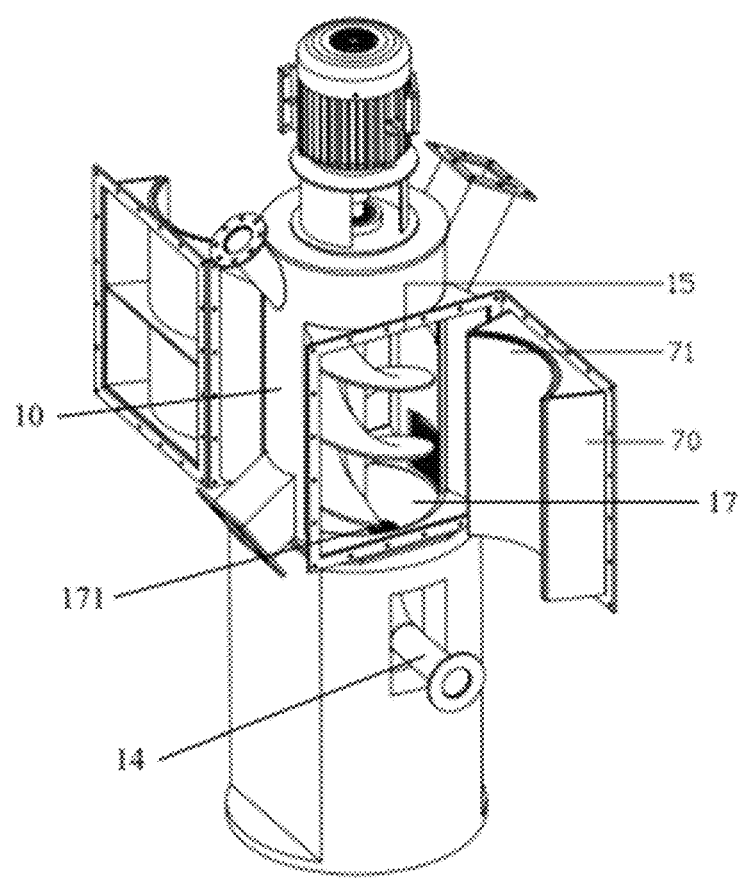
FIG. 7 is a conceptual diagram (ventilation openings arranged in a circular shape) illustrating the interior of the vertical grinding mill of the present invention.
Figure 8:
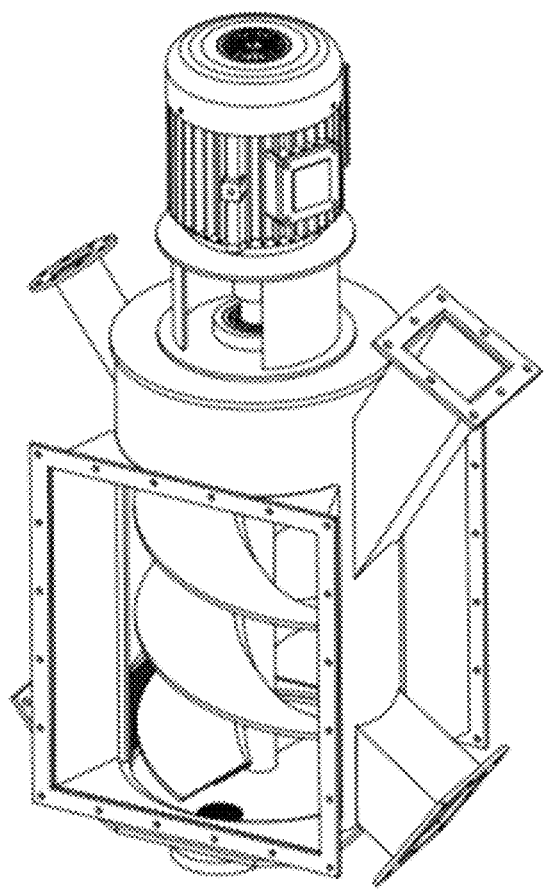
FIG. 8 is a conceptual diagram (ventilation openings arranged in a circular shape) illustrating the installation of the rotating shaft and the double-spiral lining palate of the present invention.
Figure 9:
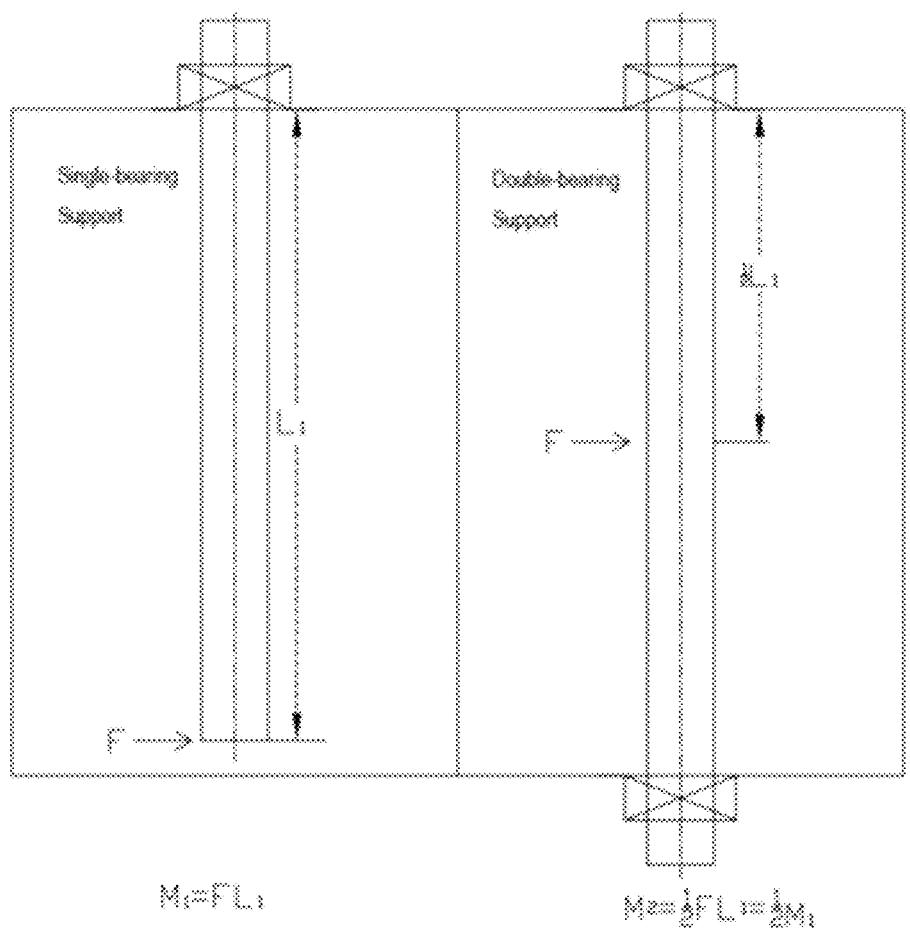
FIG. 9 is a conceptual diagram illustrating the moment analysis of the double-bearing support of the present invention and the conventional single-bearing support.

10—Shell, 11—Feeding Port, 12—Dust-collecting Port, 13—Discharging Port, 14—Air-blowing Port, 15—Opening, 16—The First Lining Plate, 17—Sieving Plate, 171—Ventilation Opening, 20—Permanent Magnet Variable Frequency Motor, 30—Rotating Shaft, 40—Double-spiral Rotor, 41—Spiral Plate, 42—Spiral Lining Plate, 50—Upper Bearing, 60—Lower Bearing, 70—Access Door, 71—The Second Lining Plate, 80—Discharging Grate, 81—Horizontal Gap, 90—Base, 91—Access Port.

DETAILED DESCRIPTION

To make the technical problems to be solved by the present invention as well as the technical solutions and benefits of the present invention clearer, drawings and detailed embodiments are combined hereinafter to further elaborate the techniques of the present invention. It should be understood that the embodiments described herein are merely used to explain but not to limit the present invention.

Embodiment 1

As shown in FIGS. 1-9, the energy-saving double-bearing vertical grinding mill for dry grinding and shaping in embodiment 1 comprises a shell 10 arranged vertically, a permanent magnet variable frequency motor 20 arranged above the shell 10, a rotating shaft 30 connected with the output end of the permanent magnet variable frequency motor 20 and a double-spiral rotor 40 arranged on the rotating shaft 30. Through adopting the double-bearing structure, the imported special coupling can be replaced by using a common coupling such that the manufacturing cycle of a vertical grinding mill can be shortened by 4-6 months. Moreover, the blind area of a single-spiral rotor can be reduced by using a double-spiral rotor 40, and the grinding stability can be enhanced. A grinding chamber is formed in the shell 10. An upper bearing 50 and a lower bearing 60 are respectively arranged at the top and the bottom of the grinding chamber. The upper bearing 50 and the lower bearing 60 are both sleeved on the rotating shaft 30 and are respectively located at the upper end and the lower end of the rotating shaft 30. The upper bearing 50 and the lower bearing 60 are both rotatably connected with the rotating shaft 30. Through this arrangement, the vibration of the double-spiral rotor 40 is reduced, and the manufacturing requirement of the rotor is lowered. Meanwhile, the rotating speed of the double-spiral rotor 40 is increased, so that the grinding efficiency is significantly improved. More specifically, the upper bearing 50 and the lower bearing 60 are rolling bearings. The upper bearing 50 and the lower bearing 60 are respectively provided with a sealing structure for protecting the two rolling bearings, preventing dust from entering the bearings and prolonging the functional life of the bearings.

A grinding medium is filled in the grinding chamber, and the upper end/upper end surface of the side wall of the shell 10 is provided with a feeding port 11 and a dust collecting port 12 in communication with the interior of the grinding chamber. At least two discharging ports 13 in communication with the interior of the grinding chamber are arranged on the lower end/the lower end surface of the side wall of the shell 10, and the lower end surface of the shell 10 is arranged in an air blowing port 14 in communication with the interior of the grinding chamber. Because the present invention adopts the double-bearing structure capable of improving the grinding efficiency, preferably, two symmetrical discharging ports 13 are arranged to improve the discharging capacity.

The side wall of the shell 10 is provided with at least one opening 15, and the opening 15 is provided with an access door 70. Preferably, the opening 15 is provided with two access doors 70. The two access doors can operate simultaneously to improve the operating efficiency. Especially during maintenance, it is unnecessary to take out the double-spiral rotor 40. The inner side wall of the shell 10 and the side wall of the access door 70 are respectively provided with a first lining plate 16 and a second lining plate 71. The first lining plate 16 and the second lining plate 71 form the grinding chamber.

The first lining plate 16, the second lining plate 71 and the grinding medium are made of a corundum material. The double-spiral rotor 40 comprises spiral plates 41 that spiral downward towards two different directions along the central axis direction of the rotating shaft 30 and a plurality of spiral lining plates 42 arranged on the spiral plates 41. The spiral lining plate 42 adopts a combined structure and is made of a corundum material, wherein the corundum material is a non-metal material such that the quantity of heavy metal exceeding the standard of the ground product can be avoided.

A discharging grate 80 is arranged at the discharging port 13, and a plurality of horizontal gaps 81 with equal intervals are arranged on the discharging grate 80. The size of the horizontal gap 81 ranges from 2-6 mm. The discharging grate 80 is used for rapidly discharging the ground material while preventing the grinding medium from being discharged.

The feeding port 11 is connected with a metering and conveying device, and the discharging port 13 is connected with a discharging control device. The discharging control device further comprises a spiral gate plate, a pneumatic gate plate, an electric flow valve and a metering device, wherein the spiral gate plate can be manually opened during maintenance.

The dust collecting port 12 is connected with a dust collector. By means of this design, the dust and heat generated in the grinding chamber during the grinding process are processed through the dust collector such that the environmental requirement is met. A sieving plate 17 A is arranged in the position where the air blowing port 14 and the shell 10 are connected, a plurality of ventilation openings 171 are formed on the sieving plate 17. These ventilation openings 171 prevent the ground material and the grinding medium from being discharged while facilitating the air blowing. As shown in FIGS. 5-8, the plurality of ventilation openings 171 is arranged at equal intervals in a ring shape or a circular shape. In this embodiment, the permanent magnet variable frequency motor 20 is arranged above the shell 10, the plurality of ventilation openings 171 is arranged in a ring shape or a circular shape, and the air blowing port 14 is connected with an air blowing device. By introducing air into the grinding process, dust and heat generated in the grinding chamber can be effectively discharged in time. Meanwhile, the smooth material discharging is ensured and improved grinding efficiency is achieved.

A base 90 is arranged below the shell 10. The base 90 is configured to be cylindrical. The portion of the base 90 above ground is hollow, and the side surface of the base 90 is provided with an access port 91. Meanwhile, through holes for discharging the grinding medium can be arranged on the lower end surface of the shell 10, so that the grinding medium can be conveniently discharged and replaced.

Embodiment 2

Figure 10:
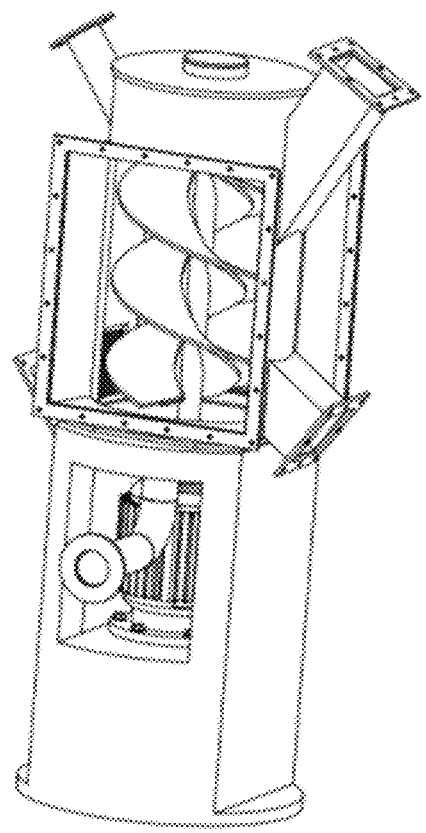
FIG. 10 is a conceptual diagram of embodiment 2 of the present invention.

As shown in FIG. 10, the difference between the energy-saving double-bearing vertical grinding mill in embodiment 1 and that in embodiment 2 is that, the permanent magnet variable frequency motor 20 is arranged below the shell 10, and the permanent magnet variable frequency motor 20 is directly fixedly arranged on the base 90. To facilitate the maintenance and installation, the access port 91 is optimized and adjusted according to the size of the permanent magnet variable frequency motor 20, and the corresponding plurality of ventilation openings are arranged in a circular shape.

The vertical grinding mill of the present invention is used for the dry grinding and shaping of powders such as cement and particles such as machine-made sand. The feeding port 11 is arranged at the upper end or the upper end surface of the side wall of the shell 10, and the discharging port 13 is arranged at the lower end or the lower end surface of the side wall of the shell 10. Through adopting the aforesaid design, materials needing to be ground are fed from the upper end and discharged from the lower end. The air blowing port 14 is arranged on the lower end surface of the shell 10 for facilitating the air blowing, which enables dust and heat generated in the grinding process to be effectively discharged in time while ensuring a smooth discharging of material. The double-bearing structure significantly reduces the vibration of the double-spiral rotor 40, greatly improving the grinding efficiency.

The energy-saving double-bearing vertical grinding mill for dry grinding and shaping of the present invention has the following advantages:

First, the conventional single-bearing support structure is replaced by adopting a double-bearing support structure. By means of this arrangement, the stress borne by the bearings is reduced, the vibration of the rotor is weakened, the vibration of the whole equipment is weakened, the dynamic load coefficient is reduced and the manufacturing requirements of the grinding mill and the rotor are lowered. Moreover, for the stress condition of the bearings is improved, the cost is saved by more than 30%, the functional life is doubled and the power consumption is reduced by 5%. The stress condition of the coupling is greatly improved such that a special coupling is no longer needed (special couplings with a power higher than 630 Kw can only be manufactured by European companies). In this way, a common coupling made in domestic can be used instead of an imported special coupling, so that the cost is reduced by 50% and the manufacturing period is shortened by 6 months. Thus, the factory can be built half a year earlier, achieving considerable economic benefits. More specifically, taking a 50 t/h vertical grinding mill as an example, if the grinding mill operates for 24 hours per day, the added value of each ton of product is 40 RMB (Chinese yuan), and the total economic benefit is about: 50 t/h*24 hours*30 days/month*6 months*40 RMB/ton=8,640,000 RMB (theoretical calculation value).

Second, the transmission device is improved. The conventional transmission structure comprising a variable frequency motor and a reducer is replaced by using a permanent magnet variable frequency motor. Through adopting the permanent magnet variable frequency motor, the transmission structure becomes simple, the transmission efficiency is enhanced, the noise is reduced, the lubricant consumed by the reducer is reduced, the consumption of cooling water is reduced, the consumption of natural resources is reduced and the establishment of an eco-friendly society is facilitated.

Third, the height diameter ratio of the grinding mill is reduced from about 1.5 to about 1.0, which improves the stress condition, reduces the vibration and lowers the manufacturing cost. More specifically, in the premise that other conditions are the same, $M_1=FL_1$ when adopting the single-bearing support structure, and $M_2=F1/2L_1=1/2M_1$ when adopting the double-bearing support structure.

In conclusion, through respectively arranging the upper bearing and the lower bearing on the upper and lower ends of the rotating shaft, the vibration and of the double-spiral rotor is reduced and the manufacturing requirement is lowered. The rotating speed of the double-spiral rotor is increased such that the grinding efficiency is improved. Through adopting the double-bearing structure, the imported special coupling is replaced by a common coupling, so that the manufacturing period of the vertical grinding mill is shortened by 4-6 months. The transmission structure is simple, the transmission efficiency is improved, the noise is reduced, the lubricant consumed by the reducer is reduced, the consumption of cooling water is reduced, the consumption of natural resources is reduced and the establishment of an eco-friendly society is facilitated.

The aforesaid is an exemplary description combined with drawings. It is obvious that the specific implementation of the present invention is not limited by the aforesaid methods. Any non-substantial improvements made by adopting the methods, concepts and technical solutions of the present invention, and the direct application of the concepts or technical solutions of the present invention in other occasions without improvement, shall fall into the scope defined by the claims of the present invention.

The invention claimed is:

1. An energy-saving double-bearing vertical grinding mill for dry grinding and shaping, comprising:
   a shell,
   a permanent magnet variable frequency motor arranged above the shell,
   a rotating shaft connected with an output end of the permanent magnet variable frequency motor, and
   a double-spiral rotor arranged on the rotating shaft, wherein a grinding chamber is formed in the shell, wherein an upper bearing and a lower bearing are respectively arranged at top and bottom of the grinding chamber, wherein the upper bearing and the lower bearing are both sleeved on the rotating shaft and are respectively located at upper end and lower end of the rotating shaft, wherein the upper bearing and the lower bearing are both rotatably connected with the rotating shaft, wherein the grinding chamber is filled with a grinding medium, and wherein an upper end-of a side wall of the shell is provided with a feeding port and a dust collecting port in communication with an interior of the grinding chamber, and wherein at least two discharging ports in communication with the interior of the grinding chamber are arranged on a lower end of the side wall of the shell, and a lower end surface of the shell is arranged in an air blowing port in communication with the interior of the grinding chamber;
   wherein the upper bearing and the lower bearing are respectively provided with a sealing structure;
   wherein the dust collecting port is connected to a dust collector, and wherein a sieving plate is arranged in the position where the air blowing port and the shell are connected, the sieving plate is provided with a plurality of ventilation openings communicated with the interior of the grinding chamber, and the air blowing port is connected to an air blowing device.

2. The energy-saving double-bearing vertical grinding mill for dry grinding and shaping of claim 1, wherein the side wall of the shell is provided with at least one opening, and the opening is provided with an access door, wherein the side wall of the shell and the side wall of the access door are respectively provided with a first lining plate and a second lining plate, and wherein the first lining plate and the second lining plate form the grinding chamber.

3. The energy-saving double-bearing vertical grinding mill for dry grinding and shaping of claim 2, wherein the first lining plate, the second lining plate and the grinding medium are made of a corundum material.

4. The energy-saving double-bearing vertical grinding mill for dry grinding and shaping of claim 1, wherein the upper bearing and the lower bearing are rolling bearings.

5. The energy-saving double-bearing vertical grinding mill for dry grinding and shaping of claim 1, wherein the double-spiral rotor comprises spiral plates that spiral downward in two different directions along a central axis direction of the rotating shaft and a plurality of spiral lining plates are arranged on the spiral plates, and wherein the spiral lining plate adopts a combined structure and is made of a corundum material.

6. The energy-saving double-bearing vertical grinding mill for dry grinding and shaping of claim 1, wherein a discharging grate is arranged at the discharging port, and a plurality of horizontal gaps with equal intervals are arranged on the discharging grate, and wherein the size of the horizontal gap ranges from 2-6 mm.

7. The energy-saving double-bearing vertical grinding mill for dry grinding and shaping of claim 1, wherein the feeding port is connected with a metering and conveying device, and the discharging port is connected with a discharging control device.

8. The energy-saving double-bearing vertical grinding mill for dry grinding and shaping of claim 7, wherein the discharging control device further comprises a gate plate, an electric flow valve and a metering device, wherein the gate plate is a spiral gate plate or a pneumatic gate plate.

9. The energy-saving double-bearing vertical grinding mill for dry grinding and shaping of claim 1, wherein a base is arranged below the shell, and the base is configured to be cylindrical, and wherein a portion of the base above ground is hollow, and the side surface of the base is provided with an access port.

* * * * *